US009794200B2

(12) United States Patent
Tsubota et al.

(10) Patent No.: US 9,794,200 B2
(45) Date of Patent: Oct. 17, 2017

(54) SERVER DEVICE, METHOD, AND SYSTEM

(71) Applicant: DeNA Co., Ltd., Tokyo (JP)

(72) Inventors: Tomo Tsubota, Tokyo (JP); Moe Matsue, Tokyo (JP); Ichito Nagata, Tokyo (JP); Yosaku Toyama, Tokyo (JP)

(73) Assignee: DENA CO., LTD., Tokyo (JP)

( * ) Notice: Subject to any disclaimer, the term of this patent is extended or adjusted under 35 U.S.C. 154(b) by 183 days.

(21) Appl. No.: 14/429,740

(22) PCT Filed: Aug. 27, 2013

(86) PCT No.: PCT/JP2013/072873
§ 371 (c)(1),
(2) Date: Mar. 19, 2015

(87) PCT Pub. No.: WO2014/045814
PCT Pub. Date: Mar. 27, 2014

(65) Prior Publication Data
US 2015/0244654 A1    Aug. 27, 2015

(30) Foreign Application Priority Data

Sep. 20, 2012    (JP) .................................. 2012-207641

(51) Int. Cl.
*G06F 15/16*    (2006.01)
*H04L 12/58*    (2006.01)
(Continued)

(52) U.S. Cl.
CPC ............. *H04L 51/04* (2013.01); *G06Q 50/01* (2013.01); *H04L 51/046* (2013.01); *H04L 51/32* (2013.01);
(Continued)

(58) Field of Classification Search
CPC ...................................................... H04L 51/04
(Continued)

(56) References Cited

U.S. PATENT DOCUMENTS 8,688,782 B1 * 4/2014 Lin ..................... G06Q 50/01
709/203
8,788,584 B2 * 7/2014 Huxley ............... G06Q 10/101
709/204

(Continued)

FOREIGN PATENT DOCUMENTS

JP    2007-502092 A    2/2007
JP    2007-518146 A    7/2007
(Continued)

OTHER PUBLICATIONS

International Search Report dated Sep. 24, 2013, issued for International Application No. PCT/JP2013/072873.
(Continued)

*Primary Examiner* — Thu Nguyen
*Assistant Examiner* — Ruben Marlang, Jr.
(74) *Attorney, Agent, or Firm* — Procopio, Cory, Hargreaves & Savitch LLP

(57) ABSTRACT

The server device stores image information uploaded by any registered user in conjunction with the identification information of the uploading user who uploaded said image information and manages the association between tagged image information that is subjected to tagging and tagged users by performing a tagging operation that associates image information uploaded to the image information storage unit by the uploading user with any registered user in response to a request from the uploading user or other registered users.

11 Claims, 8 Drawing Sheets

(51) Int. Cl.
*H04L 29/08* (2006.01)
*G06Q 50/00* (2012.01)
*H04N 1/32* (2006.01)

(52) U.S. Cl.
CPC ......... *H04L 67/02* (2013.01); *H04N 1/32101* (2013.01); *H04N 2201/3205* (2013.01)

(58) Field of Classification Search
USPC ........................................................ 709/206
See application file for complete search history.

(56) References Cited

U.S. PATENT DOCUMENTS

| | | | |
|---|---|---|---|
| 2005/0021624 A1 | 1/2005 | Herf et al. | |
| 2010/0287053 A1* | 11/2010 | Ganong | G06F 17/30247 705/14.66 |
| 2011/0044512 A1* | 2/2011 | Bambha | G06F 17/30256 382/118 |
| 2011/0131254 A1* | 6/2011 | Flaks | G06Q 10/06 707/805 |
| 2011/0202531 A1* | 8/2011 | Zuckerberg | G06Q 30/02 707/737 |
| 2012/0027256 A1* | 2/2012 | Kiyohara | G06F 17/30029 382/103 |
| 2012/0054838 A1 | 3/2012 | Kim et al. | |
| 2012/0314916 A1* | 12/2012 | Rothschild | G06K 9/00288 382/118 |
| 2012/0328169 A1* | 12/2012 | Heeter | G06T 11/60 382/118 |
| 2013/0036459 A1* | 2/2013 | Liberman | H04L 9/0866 726/6 |

FOREIGN PATENT DOCUMENTS

| | | |
|---|---|---|
| JP | 2012-519908 A | 8/2012 |
| KR | 10-2008-0100397 | 11/2008 |
| KR | 10-2012-0066085 | 9/2010 |

OTHER PUBLICATIONS

Takuya Tanaka, Kono issatsu de Tsuittaa & Feisubukku no urawaza—kihon waza ga zembu wakaru! [This book will help you learn the tips and basic skills for Twitter & Facebook!] First edition, Japan, Seishun Publishing Co., Ltd. Gentaro Ozawa, Aug. 5, 2011 1st edition, pp. 128-130.

Mika Inoue, Kyou kara hajimeru Feisubukku ninki no himitsu ga maruwakari! [Learn the secrets of being popular on Facebook beginning today!] Nikkei PC21 vol. 16, No. 5, Japan, Nikkei BP, Nikkei Business Publications, Inc., Feb. 24, 2011, vol. 16, pp. 95-109.

Hasegawa Yutoshi, Denshi jouhou tsuushin gakkai 2012 nen sougou taikai kouen ronbun shu, Jouhou Shisutemu 2 [Institute of Electronics, Information and Communication 2012 General Conference Papers, Information Systems 2], Japan, Corporate Juridical Person "Institute of Electronics, Information and Communication", Mar. 6, 2012, p. 160.

Ryoko Morishima, Facebook Perfect GuideBook, first edition, Japan, Sotechsha Co., Ltd., Junichi Yanagisawa, Jun. 30, 2011, 1st edition, p. 131.

Office Action in Japanese Patent Application No. 2012-207641 dated Nov. 12, 2014.

Office Action for KR App. No. 10-2015-7006473.

* cited by examiner

SERVER DEVICE, METHOD, AND SYSTEM

The present application claims is a National Stage entry of PCT/JP2013/072873, filed on Aug 27, 2013, which claims the benefit of Japanese Patent Application No. JP2012-207641, filed on Sep. 20, 2012, the contents of which is incorporated herein in its entirety by reference.

TECHNICAL FIELD

The present invention relates to technology for transmitting and receiving messages using information processing terminals.

BACKGROUND ART

Heretofore, services referred to as "chat" have been offered for the purpose of real-time text communication using PC (Personal Computer) terminals, mobile terminals, and other information processing devices. Multi-functional mobile terminals called smartphones have been rapidly growing in popularity since 2010. Numerous chat services predicated on being used with mobile terminals have been offered, and their user bases continue to expand. Due to the increased popularity of such services, it has been expected that new services and functionalities will appear and allow for shared communities to be formed even among friends who may not be previously acquainted.

For example, as disclosed in Patent Document 1, a user who has joined an SNS (Social Networking Service) uploads an image and tags it with the identification information of the users associated with the image. The tagged image is made public, to a certain extent, including its association with the user, thereby promoting the creation of a new community.

PRIOR ART DOCUMENTS

Patent Documents

Patent Document 1: Japanese Patent Application Publication No. 2012-519908.

SUMMARY OF THE INVENTION

Problems to be Solved by the Invention

However, in tagging operations in conventional techniques, various restrictions were imposed and sometimes cumbersome procedures were required.

The present invention has been devised by taking such problems into consideration and it is an object of the invention to provide a server device, a method, and a system capable of promoting smoother communication by applying restrictions to tagging in an appropriate manner.

Means for Solving the Problems

One aspect of the present invention relates to a server device. This server device is provided with an image information storage unit in which image information uploaded by any registered user who is registered with the service is stored in conjunction with identification information relating to the uploading user who uploaded said image information; a tagging control unit that manages the association between tagged image information that is subjected to tagging and tagged users by performing a tagging operation that associates the image information uploaded to the image information storage unit by the uploading user with any registered user in response to a request from the uploading user or other registered users; and a display control unit that displays the tagged image information stored in the image information storage unit on a user information screen, on which information relating to tagged users managed by the tagging control unit is to be displayed.

According to this aspect, performing a tagging operation that associates the image information uploaded to the image information storage unit by the uploading user with any registered user in response to a request from the uploading user or other registered users allows for tagging to be requested even for users other than the uploading user and, in addition, enables selection of any registered user as a tagged user. By imparting more flexibility to tagging in this way, smoother communication can be promoted.

In addition, this server device may be further provided with a chat control unit that controls chat sessions between multiple registered users. With respect to the image information storage unit, while a chat session is in progress in the chat control unit, the tagging control unit may perform a tagging operation that associates uploaded image information with a registered user taking part in a chat session, as a tagged user, if there is a request to perform a tagging operation on image information uploaded while a chat session is in progress in the chat control unit.

According to this aspect, if there is a request to tag image information uploaded while a chat session is in progress, tagging is made possible even during chat sessions by performing a tagging operation that associates uploaded image information with the registered tagged users taking part in the chat session. In addition, even in the case of an image viewable only by a limited number of users in the closed space of a chat session, performing a tagging operation on the image allows for it to be shared even with users who are not taking part in the chat session, which makes it possible to promote smoother communication.

In addition, this server device may be provided with a group configuration unit that configures a plurality of groups respectively having specific characteristics, and a group management unit that manages the association between the identification information of groups selected by a registered user among the plurality of groups configured by the group configuration unit and the identification information of this registered user. In this server device, in the event that any of the groups managed by the group management unit is selected as a tagged user, the tagging control unit performs a tagging operation on the identification information of the selected group and tagged image information and, may also perform a tagging operation on each of one or more registered users associated with said group in the group management unit and the tagged image information. In addition, the display control unit may display tagged image information that has been tagged at the group level on a group information screen, on which information relating to said group is to be displayed, as well as on the user information screen of one or more registered users associated with said group in the group management unit.

According to this aspect, tagging the identification information of the selected group and the tagged image information, as well as tagging each of one or more registered users associated with said group in the group management unit and the tagged image information, allows for images to be shared using groups representing specific common denominators as units and, in addition, enables sharing with users within the groups, which promotes smoother intra-group communication.

In addition, this server device may be provided with a server communication unit which, upon completion of the tagging operations by the tagging control unit, sends the tagged users managed by the tagging control unit a notification of tagging and provides link information to the tagged image information.

According to this aspect, sending a notification of tagging and link information to the tagged image information to the tagged users managed by the tagging control unit upon completion of tagging makes it possible to reliably inform the users of the fact that they have been tagged, encourage subsequent intra-group communication, and promote smoother communication.

In addition, in the event that a tagged user managed by the tagging control unit in this server device is an unregistered user who is not registered with said chat service, the server communication unit may send this unregistered user a notification of tagging and link information to the tagged image information by e-mail.

According to this aspect, even when tagging unregistered users, the notification of tagging and link information to the tagged image information can be provided more efficiently and the unregistered users can be encouraged to participate in the chat system. This can help increase the number of participants in the entire chat system and promote smoother and livelier communication.

In addition, this server device may be provided with a publishing settings management unit which, for every registered user, depending on a selection made by said registered user, configures whether or not tagged image information when the user is a tagged user should be made "always open to the public" on the user information screen of said registered user, or, if the selection has been made to not make it "always open to the public", issues a query whether or not to make it open to the public if the user is considered as a tagged user in the tagging control unit. In this server device, if the setting used in the publishing settings management unit is "always open to the public" or if the response to the query is open to the public, the display control unit permits viewing of tagged images on the user information screen of said registered user by other registered viewers, and, if the response to the query is not open to the public, prohibits viewing by other registered users.

According to this aspect, privacy management can be implemented in a fine-tuned manner, such that the setting "always open to the public" is configured depending on the selection made by said registered user, and if the selection is set to not "always open to the public", then the user is queried as to whether or not a public disclosure should be made if the user is considered a tagged user in the tagging control unit, which makes it possible to promote smoother communication.

In addition, even if the response from a tagged user, who has selected to not "always open to the public" in the publishing settings management unit, is "hide", the tagging control unit of this server device may still maintain an association between the tagged user and the tagged image information.

According to this aspect, maintaining an association between the tagged user and the tagged image information even if the response is "hide" allows for privacy management to be implemented in a fine-tuned manner and makes it possible to promote smoother communication.

In addition, this server device may be provided with a user information management unit that manages at least one item, such as a name, an ID number, or a facial image information record, as user information in order to identify registered users and non-registered users, and a facial recognition processing unit that performs facial recognition on the tagged image information contained in the image information stored in the image information storage unit to determine whether or not at least one facial image information record imaged in said image information matches any facial image information record among a plurality of user information records managed by the user information management unit. If the two facial image information records are determined to be a match by the facial recognition processing unit, the tagging control unit of this server device may associate said image information with user information that includes the facial image information managed by the user information management unit.

According to this aspect, performing facial recognition on the tagged image information can simplify tagging and ease the burden on the user.

In addition, in this server device, in response to a request from any registered user, the tagging control unit deletes the association between the registered user associated with the request and the tagged image information.

According to this aspect, anyone can delete malicious tagging and smoother communication can be promoted due to the fact that, in response to a request from any registered user, the association between the registered user associated with the request and tagged image information is deleted. Restrictions on tagging are loose thereby allowing anyone to tag any image, and while this may have the harmful effect of tagging by malicious users, this can be prevented because anyone can delete tags.

In addition, in this server device, in the event of a delete request regarding stored image information, the image information storage unit may delete this image information only if the registered user associated with the delete request is the uploading user of said image information. If image information is deleted in the image information storage unit, the tagging control unit may delete the association between the image information and the tagged user. The display control unit may hide the tagged image information on the user information screen of the tagged user, whose association has been deleted in the tagging control unit.

According to this aspect, deleting image information only when the registered user associated with the delete request is the uploading user of said image information makes it possible to appropriately manage the images and can promote smoother communication. In addition, although tag deletion becomes very cumbersome when there is a large volume of malicious tags, all such tags can be erased at once by deleting the image information.

Another aspect of the present invention is a control method. This control method includes a step for storing image information uploaded by any registered user who is registered with the service; a step for managing the association between tagged image information that is subjected to tagging and tagged users by performing a tagging operation that associates image information uploaded by the uploading user with any registered user in response to a request from the uploading user who uploaded the image information or other registered users; and a step for displaying the tagged image information on a user information screen, on which information relating to tagged users is displayed.

Another aspect of the present invention is a system. This system includes a server device and terminal devices. The server device is provided with an image information storage unit that stores image information uploaded by any registered user registered with a service; a tagging control unit that manages the association between tagged image information that is subjected to tagging and tagged users by performing a tagging operation that associates the image information uploaded to the image information storage unit by the uploading user with any registered user in response to a request from the uploading user who uploaded the image information or other registered users; and a display control unit that displays the tagged image information stored in the image information storage unit on a user information screen, on which information relating to tagged users managed by the tagging control unit is displayed. The terminal devices include an input interface that receives instructions from users; a terminal storage unit that stores any image information; a contact information storage unit that stores names in conjunction with contact details; a screen interface that displays information in accordance with instructions from the display control unit; and a terminal communication unit that uploads the image information stored in the terminal storage unit to the server device in accordance with content received via the input interface. In this terminal device, the terminal communication unit, in accordance with content received via the input interface, selects users corresponding to the names stored in the contact information storage unit as tagged users and also selects the image information displayed on the screen interface as tagged image information, thereby issuing a tagging request to the server device.

It should be noted that all arbitrary combinations of the constituent elements above, as well as subject matter produced by translating the wording of this invention into different methods, apparatus, systems, computer programs, and the like, are valid as aspects of the present invention.

Effects of the Invention

According to the present invention, applying restrictions to tagging in an appropriate manner makes it possible to promote smoother communication.

BEST MODE FOR CARRYING OUT THE INVENTION

A summary of the present invention will be provided first, before describing the embodiments of the present invention.

The present invention is applicable to a chat service or a social networking service (SNS), etc. used for transmitting and receiving messages between information communication terminal devices. Users who are registered with such services are hereinafter referred to as "registered users".

The registered users can tag any users to images uploaded to chat screens or images uploaded to user information screens, on which the profile photos, profile information, and the like of the users are displayed.

The users who can perform tagging (tagging users) may be different from the users who upload the images (uploading users). In addition, the users subject to tagging (tagged users) may be any users and, furthermore, groups having multiple registered users can also be selected as units.

In conventional chat services and SNS, tagging operations during chat sessions are impossible and only uploading users are authorized to perform tagging operations, such that sharing is not allowed even if one wants to share images between specific users or groups. In addition, cumbersome and complex procedures are necessary, e.g. multiple operations have to be performed by the tagging user.

In the present invention, as a result of eliminating the problems above and applying restrictions to tagging in an appropriate manner, a person who wishes to share images can tag the people with whom he or she wishes to share with, and moreover, this makes it possible to promote smoother communication. An example of the present invention applied to a chat service will be discussed below.

Embodiment 1

Figure 1:
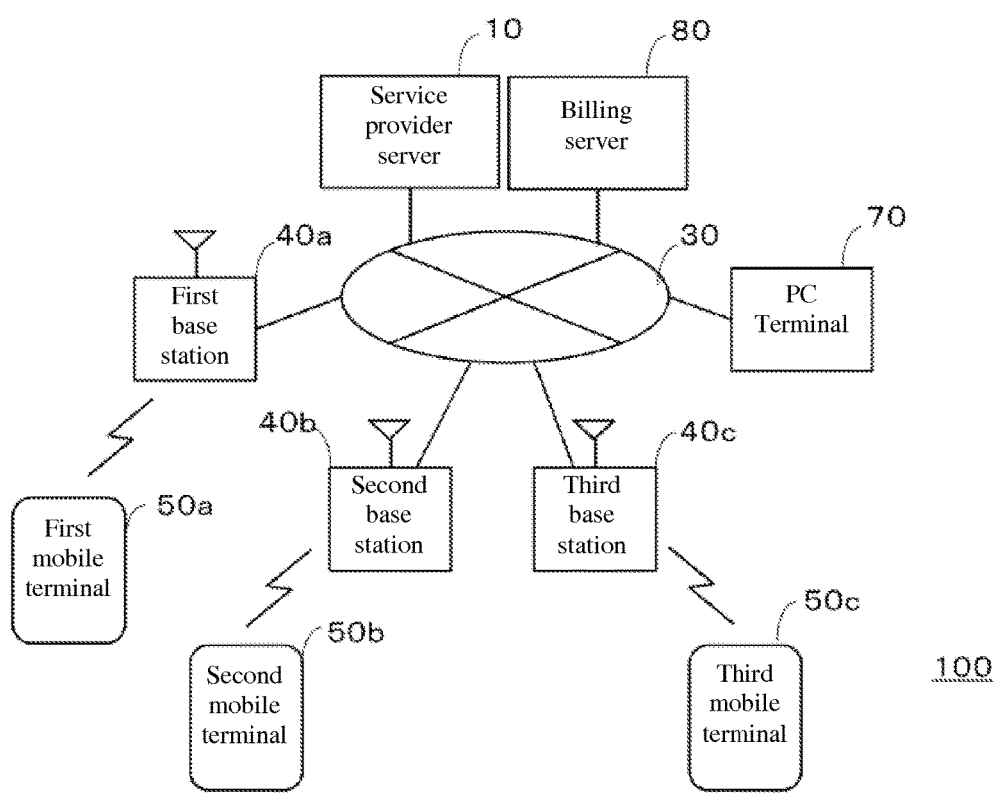
FIG. 1 A diagram illustrating a chat system according to Embodiment 1.

Embodiment 1 will be discussed first. FIG. 1 is a diagram illustrating a chat system 100 according to Embodiment 1 of the present invention. The chat system 100 includes: a server 10; a network 30, which connects the server 10 and base stations 40 using wired connections; first base station 40a—third base station 40c, which are represented by base station 40; first mobile terminal 50a—third mobile terminal 50c, which are represented by mobile terminal 50; and a PC terminal 70.

It should be noted that while only three base stations 40 and three mobile terminals 50 are shown in the drawing for convenience of illustration, their number is not limited and there may be more base stations 40 and mobile terminals 50. The same applies to the PC terminal 70. In addition, despite the fact the first mobile terminal 50a —third mobile terminal 50c are illustrated as being connected to respectively different base stations 40, this need not be the case, and the present invention is, of course, applicable even if multiple mobile terminals 50 are connected to a single base station 40.

The server 10 is a device used to implement and provide a chat service. The server 10 carries out communication processing for the purpose of chat processing between the mobile terminals 50 and PC terminal 70 via the network 30 and base stations 40. It should be noted that, for simplicity of description, the discussion below uses expressions such as "carries out communication processing between the server 10 and the mobile terminals 40, along with the PC terminal 70", and the like, and does not mention the fact that this is done via the network 30 and base stations 40. Additionally, in the discussion below, the mobile terminals 50 and PC terminal 70 may be collectively referred to as "user terminals".

Here, the server 10 has a user information management function that manages information relating to the registered users registered with the chat system; a mail merge function used for chatting with chat partners; a tagging control function that controls tagging operations on images uploaded by registered users; and a display control function that exercises control for displaying a chat screen, a user information screen, and the like on the screens of the user terminals of the registered users.

The user information management function manages contact information uploaded from user terminals and image information, such as photographs, videos, and the like, in association with the identification information assigned to the uploading users. Specifically, first of all, after an application used to run the chat system on the user terminals is downloaded in response to a request from a user terminal, the contact information that is stored in the memory of the user terminal is uploaded and imported into the memory of the server 10 in association with the identification information assigned to the registered user. After such processing, the user can start using the chat service.

The registered user can upload any image information while conducting a chat session. This allows for the image information to be shared with chat partners. Since chat is a type of closed communication, users who are not parties to a chat session cannot see messages sent during the chat session or image information uploaded during the chat session.

In addition, registered users can upload image information to a user information screen, on which the profile photos, profile information, and the like of the users are displayed. Uploading is possible not only to the user information screen of the uploading user, but also to the user information screens of other registered users. At such time, when images are uploaded to the user information screens of the uploading users, the tagging of the uploading users to the images may be performed automatically. In addition, when images are uploaded to the user information screens of other registered users, the tagging of the other registered users (uploading users) to the images may be performed automatically. At such time, the tagging of the uploading users to the images may also be optional.

The mail merge function is a function used to conduct chat sessions with select users without the user having to consider whether the chat partner is a registered user or not. If a chat service initiation request arrives from a user terminal, the server 10 determines the mode to be used by the chat service for communication with the destination party. Specifically, it determines the most suitable communication mode based on registration information stored in the memory of the server 10 in accordance with information indicating the order of priority of the communication modes to be employed (hereinafter referred to as priority information), converts the message transmitted from the user terminal to this communication mode, for example, to the e-mail format, and transmits it to a destination party.

In principle, if the destination party is a registered user, the chat mode is selected as the communication mode employed for communication with the destination party. On the other hand, if the destination party is an unregistered user, a mode is selected that corresponds to the information registered in memory in connection with the unregistered user. Further details are discussed below. In accordance with this aspect, even if the destination party is an unregistered user, the user can chat therewith even without being aware of the fact.

The tagging control function tags any registered user to the uploaded image information in response to a request from any registered user. It is characterized by the fact that there need not be an association between the tagging users, tagged users, and uploading users, and anyone can perform tagging as long as he or she is a registered user. It should be noted that tagging operations may be performed automatically using facial recognition in response to the uploading of image information. The process of facial recognition is carried out by determining whether or not the profile photo information of the registered users registered with the system in advance matches the imaged facial information contained in the uploaded image information. Such facial recognition may be carried out using predetermined conventional techniques related to facial recognition technology.

Image information that can be selected as an object of tagging may be image information uploaded during a chat session and image information displayed on the user information screen of any user. That is, anyone can tag any uploaded image information regardless of the identity of the user that uploaded the image information.

Users who can be selected as the object of tagging may be any registered user, and a specific group may also be selected as the object. In addition, unregistered users who are not registered with the chat system can be tagged as well.

For example, although group photos are sometimes taken during weddings and related ceremonies, in such photos, newly acquainted users are very often shown together in the same photo. In such cases, the users may not be friends and relationships rarely develop with people one does not directly talk to. However, in such cases, there is a chance that tagging such a group photo may provide an opportunity for building a relationship, which further enhances the social value of the service.

It should be noted that tags can be deleted even if a user is considered a tagged user. Such deletion is possible for any registered user.

After having been subjected to tagging, the tagged user in question is notified of having been tagged and provided with link information to the tagged image information. As far as the methods of notification are concerned, notification may be carried out by sending a message via the chat system, by displaying it on the user information screen of the tagged user, or by other methods such as pre-registered electronic mail. It should be noted that if the tagged user is an unregistered user, notification is carried out using pre-registered communication methods such as e-mail or the like.

The display control function displays images associated with the service provided by the chat system on the user terminal of the user. For example, when users are registered with the chat system, all of the user information uploaded individually for each user is displayed together on the user information screen. In addition, if a group has been formed, the names, etc. of the registered users who are members of this group are displayed on the group information screen. In addition, messages sent to one another or uploaded image information are displayed when a chat session is in progress.

When a tagging operation is performed, the tagged image information is displayed on the user information screen of the tagged user. The displayed information can be viewed by the tagged user and by other registered users. However, if the tagged user has a setting that prohibits viewing by other registered users, then access by other registered users is prohibited, and, as a result, viewing by other users becomes impossible. It should be noted that when the object of tagging is a group, the tagged images are displayed both on the group information screen and on the user information screens of the registered users belonging to this group.

Figure 2:
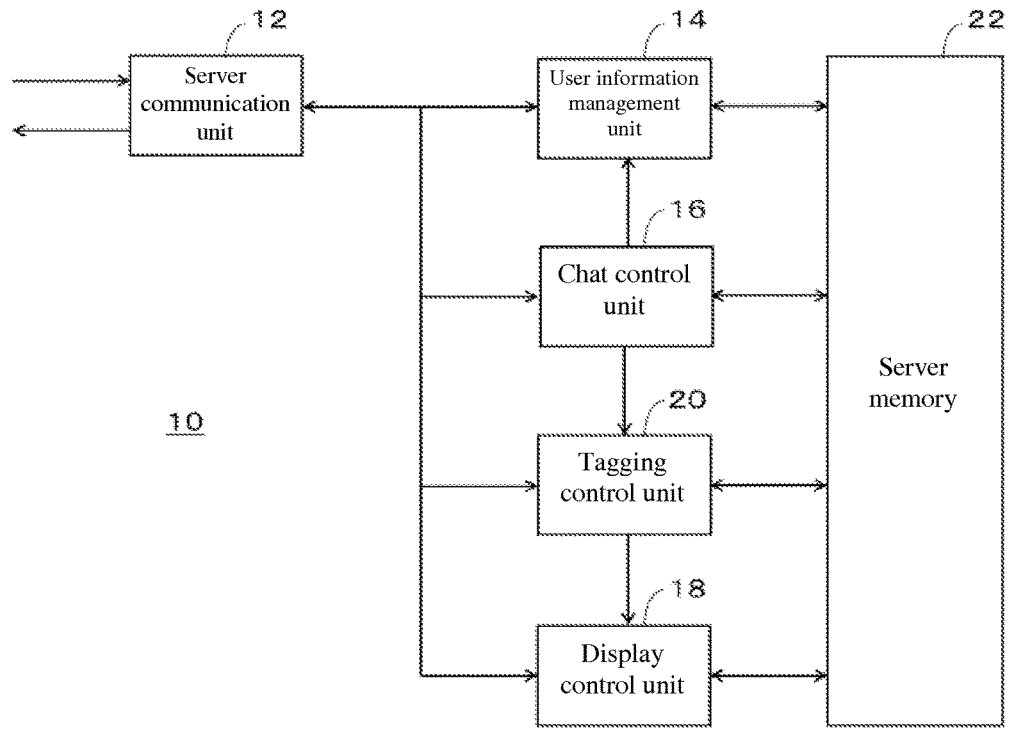
FIG. 2 A diagram illustrating an exemplary server configuration in the chat system of FIG. 1.

FIG. 2 is a diagram illustrating an exemplary configuration of the server 10 in the chat system 100 of FIG. 1. The server 10 includes a server communication unit 12, a user information management unit 14, a chat control unit 16, a display control unit 18, a tagging control unit 20, and a server memory 22.

The server communication unit 12 receives signals from user terminals, carries out predetermined demodulation processing, and sends demodulated signals to the user information management unit 14, chat control unit 16, display control unit 18, and tagging control unit 20. In addition, signals sent from the user information management unit 14, chat control unit 16, display control unit 18, and tagging control unit 20 are subjected to predetermined modulation and transmitted to the user terminals. It should be noted that conventional modulation/demodulation technology may be employed for the modulation/demodulation processing in the server communication unit 12 and, as will be appreciated by those skilled in the art, the present invention is applicable even to this aspect.

The user information management unit 14 receives contact information and image information uploaded from the user terminals via the server communication unit 12. For example, the contact information stored by the user terminals is uploaded when the application (hereinafter referred to as "chat application") used to run the chat service on the user terminals is installed in the user information management unit 14. At such time, the user information management unit 14 first assigns an ID to the user terminal acting as the uploader. Accordingly, the user information management unit 14 may register the ID assigned to the user terminal in the server memory 22 in conjunction with its contact information.

In addition, the user information management unit 14 stores the image information uploaded by any registered user in the server memory 22 in conjunction with the ID of the uploading user who uploaded said image information. If the image information is uploaded while a chat session is in progress in the hereinafter described chat control unit 16, the uploaded image information is stored in the server memory 22 in conjunction with the ID of the registered user taking part in the chat session who uploaded the image information.

Furthermore, the user information management unit 14 matches contact information uploaded during registration with the system by newly registered users against the contact information of the registered users. As used herein, the term "contact information of the registered users" refers to the contact information of the users who have already been registered with the chat service. In addition, the user information management unit 14 may match the uploaded contact information against the registered contact information. The term "registered contact information" refers to the contact information that is stored in the server memory 22 and includes the contact information of unregistered users already imported by other registered users.

The "contact information" includes names, furigana spellings, phone numbers, mobile phone numbers, e-mail addresses, SNS information, user information, and the like. The phone numbers, mobile phone numbers, e-mail addresses, or SNS information may have multiple entries. The SNS information includes one or more information elements required for identifying a user in SNS such as Facebook, Twitter, mixi, LinkedIn (all the 4 names above are registered trademarks) and for contacting this user. User information, which is information indicating whether or not an application used to run the chat system has been installed, serves as a flag for determining whether a user is a registered user or an unregistered user.

If a common portion is found in two pieces of contact information as a result of matching, the user information management unit 14 stores both pieces of contact information in a consolidated form. For example, assuming that these are two contact information records such as the ones shown below, the names and mobile phone numbers in both contact information records are identical. For this reason, both pieces of contact information can be presumed to be associated with the same person.

Uploaded Contact Information

| Name | A |
|---|---|
| Mobile phone number | 090-XXX-YYYY |
| E-mail address | b@ppp.co.jp |

Registered Contact Information

| Name | A |
|---|---|
| Mobile phone number | 090-XXX-YYYY |
| Phone number | 03-mmmm-nnnn |
| E-mail address | a@qqq.ne.jp |

Accordingly, the user information management unit 14 consolidates the two contact information records above and stores them in the server memory 22 as a single contact information record such as the one shown below.

Consolidated Contact Information

| Name | A |
|---|---|
| Mobile phone number | 090-XXX-YYYY |
| Phone number | 03-mmmm-nnnn |
| E-mail address | a@qqq.ne.jp |
| E-mail address | b@ppp.co.jp |

It should be noted that if the two pieces of contact information are completely identical, the user information management unit 14 may not have to perform the consolidation operation. This is due to the absence of mutually complementary information. In addition, during the consolidation, the number of common portions may be used as a criterion for determining whether or not the consolidation should be performed. A match between one or more predetermined information elements may also be used as a criterion, and a combination thereof may also be used. This is due to the fact that the larger the number, the higher the probability of being associated with the same person. In addition, for example, using names and mobile phone numbers as the one or more predetermined information elements makes it possible to use contact information that does not change or is not likely to be modified as a criterion and, for this reason, the probability of being associated with the same person can be made even higher. It should be noted that while there is a tradeoff relationship between raising the probability and aspects such as processing speed and processing load, in view of these factors, it can be said that the above-mentioned number is suitably 2 or 3, and the predetermined information is suitably a combination of a name and a mobile phone number and/or a phone number.

The chat control unit 16 receives a signal from the server communication unit 12, carries out processing according to its content, accesses the server memory 22, and instructs the server communication unit 12 to transmit it. The server communication unit 12 transmits the predetermined message to the destination party using the communication mode selected by the chat control unit 16.

The signals received from the server communication unit 12 are signals from the user terminals such as, for example, requests to download the chat application, contact information, and image information uploaded from the user terminals, user selections made to register chat partners and friends, as well as messages addressed to a destination, and the like.

In addition, the chat control unit 16 reads the chat application used for downloading from the server memory 22 by the users, imports the contact information transmitted from the user terminals, and accesses information used to determine the communication mode. The chat control unit 16 allows for applications to be downloaded to the user terminals in response to requests from the users. After downloading to a user terminal, the chat control unit 16 queries the user terminal as to whether or not to import the contact information stored in this user terminal into said server 10. If a permission to import is obtained, the contact information is sent from the user terminal and, accordingly, the chat control unit 16 writes said information to the server memory 22.

In addition, when determining the mode of communication for a destination, the chat control unit 16 selects one communication mode from one or more communication modes registered in the server memory 22 in association with destinations based on information indicating the order of priority of the communication modes to be employed. Details regarding the selections and the "information indicating the order of priority of the communication modes to be employed" will be described below.

In addition, the chat control unit 16 configures multiple groups each having its own specific character. The group configuration unit configures multiple groups each having its own specific character. In addition, the group management unit manages the identification information of the group selected by the registered users among the multiple groups configured by the group configuration unit in association with the identification information of the registered users in the server memory 22.

As used herein, the term "group" refers to a group created by any user based on the presence of any features shared by the users, such as the same hobbies, residing in the same geographical area, or the like. A group can be joined by invitation from a user already belonging to the group or by one's own choice. When one joins a group, the group ID of the group one has joined is added to one's user information. Using this group ID makes it easier to chat with specific peers and facilitates event generation and management.

In response to a chat request from a user terminal, the chat control unit 16 accesses the server memory 22 to acquire information on the destination of the user terminal requesting a chat session, determines the mode of communication with the destination, and transmits it to the user information management unit 14. The user information management unit 14 converts the message directed to the destination received from the user terminal to the format of the communication mode transmitted from the user information management unit 14. The conversion performed by the user information management unit 14 may be accomplished using publicly known methods.

The chat control unit 16 selects one communication mode from one or more communication modes registered in the server memory 22 in association with the received destination user based on the information indicating the order of priority of the communication modes to be applied. However, the operation of the chat control unit 16 varies depending on whether or not the message received from the server communication unit 12 is in the chat format. This is due to the fact that in the case of the chat format, the message is from a registered user, and in the case of a format other than chat, the message is from an unregistered user.

Here, a case in which the message received from the server communication unit 12 is in the chat format will be discussed with reference to examples. In this example, it is assumed that the contact information for User A, User B, and User C shown below is stored in the server memory 22.

User A
   Name
   E-mail address
   Registered user
User B
   Name
   E-mail address
   SNS information
   Unregistered user
User C
   Name
   E-mail address 1
   E-mail address 2
   Unregistered user In addition, it is assumed that the priority information (information indicating the order of priority of the communication modes to be employed) has been configured as follows. It should be noted that this priority information is, for example, the following information. Priority 1 indicates the highest priority, and the larger the number, the lower the priority.

Priority 1 Chat format
Priority 2 E-mail format
Priority 3 SNS format It should be noted that this priority information may be configured individually for each registered user. In addition, registered users may be configured in a discretionary manner. Furthermore, the chat format may be configured as Priority 1 at all times, and in such a case, users can configure the formats of Priority 2 or lower in a discretionary manner.

As in the case above, a case will be discussed in which User A is the destination. First, the chat control unit 16 acquires user information from the contact information stored in association with the destination. Here, the user information is used to determine that the destination user is a registered user and, in this case, the chat format is selected.

Here, the chat control unit 16 converts the received message to the chat format. It should be noted that in the case of a registered user, the chat format may be selected without accessing the priority information.

A case in which User B is the destination will be discussed next. Unlike the case of User A above, User B is an unregistered user. In such a case, the chat control unit 16 references Priority 2 in the priority information. Here, Priority 2 is the e-mail format, and therefore the chat control unit 16 performs a matching operation to determine whether or not an e-mail address is present in User B's contact information.

In the above-described example, User B has an e-mail address. For this reason, the chat control unit 16 selects the e-mail format as the mode of communication. It should be noted that if there is no e-mail address registered for User B, a determination is made as to whether there is a record for the SNS format, which has the next priority level of Priority 3, and since in this case SNS information has been registered in User B's contact information, the chat control unit 16 selects the SNS format.

A case in which User C is the destination will be discussed next. Since according to User C's registration information, User C is an unregistered user, the control unit 16 checks whether or not User C's registration information contains an e-mail address in order to determine whether it is possible to select the e-mail format, which is Priority 2. Here, there are two e-mail addresses in User C's registration information. In such a case, the chat control unit 16 preferentially selects the e-mail address of the mobile phone.

It should be noted that if two or more mobile phone e-mail addresses have been registered, the e-mail address registered later may be selected. This is due to the fact that the e-mail address registered later may represent the most recently registered new information and thus can be used to deliver a message to User C in a more reliable manner.

In addition, while the e-mail format has been configured as Priority 2 in the priority information, its priority may be configured depending on the destination, as shown in Priority Information Example 2 below.

<Priority Information Example 2>
Priority 1 Chat format
Priority 2 E-mail address for destination other than mobile phone
Priority 3 E-mail address for mobile phone In addition, it is possible to configure a general-purpose e-mail address intended either for a mobile phone or for another destination, such as gmail.com or a free e-mail address, as shown in Priority Information Example 3 below. Configuring the priority information this way allows for the destination to be selected in a more flexible manner and makes it possible to more reliably deliver messages to the destination.

<Priority Information Example 3>
Priority 1 Chat format
Priority 2 General-purpose e-mail address
Priority 3 E-mail address for mobile phone
Priority 4 E-mail address for destination other than mobile phone If the destination is an unregistered user, the chat control unit 16 attaches URL information to the message received from the server communication unit 12. The term "URL information" refers to information relating to a link to a web page that provides an introduction to the chat system for unregistered users. By clicking on this information link, unregistered users can access the server 10 and, from there, can download a chat application used for chat. Subsequently, the chat control unit 16 converts the message to be transmitted to the selected communication mode and sends it to the server communication unit 12.

A case in which the message received from the server communication unit 12 has a format other than chat will be discussed next. In this case, the message is a message from an unregistered user to a registered user. For this reason, the registration information of the destination user refers to a registered user in the server memory 22. Here, the chat format corresponds to Priority 1 of the priority information for registered users. Accordingly, as described above, the user information management unit 14 selects the chat format as the communication mode of the message intended for the registered user.

Subsequently, the chat control unit 16 converts the message received from the unregistered user to the chat format. The converted message is transmitted to the destination user terminal 50 via the server communication unit 12. On the user terminal 50, the transmitted message is displayed on the chat interface screen of the terminal display. In accordance with the aspect above, in the chat system 100, appropriate conversion of communication modes based on the priority information and contact information stored on the server 10 allows for smooth chat sessions between registered members and unregistered members to be implemented without making the users perform redundant operations.

If a user accesses the chat system, the display control unit 18 transmits images, text, and other information to be displayed on the screen of the user terminal via the server communication unit 12. For example, when a user information screen is displayed, the display control unit 18 accesses the server memory 22 to acquire the user's user information to be displayed and creates a user information screen in a predetermined format. In addition, when a tagging operation is performed in the hereinafter described tagging control unit 20, the tagged image information is displayed on the user information screen of the tagged user. Further details are discussed below.

Figure 3:
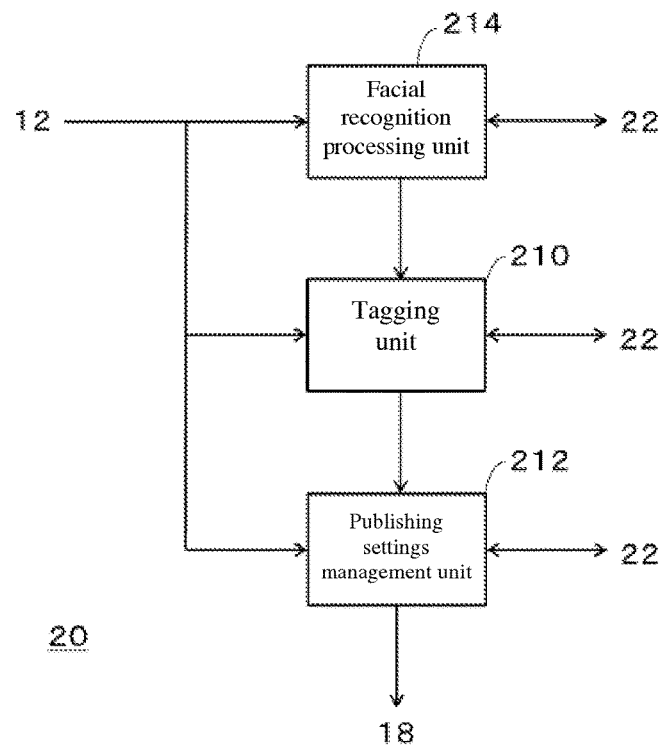
FIG. 3 A diagram illustrating an exemplary configuration of the tagging control unit of FIG. 2.

The tagging function will be discussed next with reference to FIG. 3. FIG. 3 is a diagram illustrating an exemplary configuration of the tagging control unit of FIG. 2. The tagging control unit 20 includes a tagging unit 210, a publishing settings management unit 212, and a facial recognition processing unit 214.

The tagging unit 210 receives a tagging-related request from a user via the server communication unit 12. The request includes information that identifies the image information uploaded to the server memory 22 as tagged image information and the identification information of the tagged user. Here, the tagging unit 210 accesses the server memory 22 and adds the identification information of the tagged user to the tagging-related information associated with the uploaded image information. The display control unit may display a list of tagged users on the chat screen or user information screen, to which the image information is uploaded.

Furthermore, the tagging unit 210 adds the ID number of the image information that is subjected to tagging to the tagging-related information contained in the user information of the registered user associated with the tagged user stored in the server memory 22. The display control unit 18 accesses the server memory 22, verifies the ID number of the image information contained in the tagging-related information, and creates a user information screen such that the tagged image information corresponding to the ID number is displayed on the user information screen of the tagged user. As a result, an association with the tagged user is created, completing the tagging operation.

Upon completion of tagging by the tagging unit 210, the server communication unit 12 sends the tagged user managed by the tagging control unit a notification of tagging and provides link information to the tagged image information. At the time of notification, the tagged user may be allowed to choose between a chat message and having it displayed on the tagged user's user information screen. Transmitting a message via chat allows for users to be instantly informed of the fact that a photograph has been uploaded and enables a smooth transition to chat.

In addition, if the tagged user is an unregistered user who is not registered with said chat service, the communication mode is determined based on the communication mode and the order of priority stored in the server memory 22 for unregistered users and a notification of tagging and link information to the tagged image information are provided in the determined communication mode (for example, by e-mail).

In addition, if a group is selected as tagged users, the tagging unit 210 reads out the identification information of the selected group from the server memory 22 and tags the image information. Furthermore, the tagging unit 210 accesses the server memory 22, reads out the IDs of one or more registered users associated with said group, and tags the image information with the respective user IDs.

Here, the display control unit 18 creates a group information screen, on which image information tagged at the group level is to be displayed, and, furthermore, creates a user information screen for the one or more registered users associated with said group, and, in response to a request from any registered user, displays the group information screen along with the user information screen on the user terminal of the user associated with the request.

In addition, if there is a request to tag the image information uploaded while a chat session is in progress in the chat control unit 16, the tagging unit 210 performs a tagging operation that associates the uploaded image information with the registered tagged users taking part in the chat session.

In addition, if there is a request from any registered user, the tagging unit 210, in order to delete the association between the registered user associated with the request and tagged image information, deletes the identification information of said tagged image information from the tagging-related information contained in the user information of the registered user subject to deletion that is stored in the server memory 22. In addition, the tagging unit 210 deletes the user ID of the registered user subject to deletion from the tagging-related information associated with the tagged image information stored in the server memory 22.

In addition, when there is a delete request regarding image information, the tagging unit 210 deletes this image information from the server memory 22 only when the registered user associated with the delete request is the uploading user of said image information. At such time, the tagging unit 210 also deletes the tagging-related information associated with this image information. Furthermore, the tagging unit deletes the identification information of the deleted image information from the tagging-related information in the user information of the tagged user contained in this tagging-related information. Here, the display control unit 18 erases the tagged image information from the user information screen of the registered user who was tagged to the deleted image information.

The publishing settings management unit 212 manages publishing settings information for every registered user. There are two types of publishing settings, including "always open to the public" and "check each time", and when a user is registered or when a user so wishes, the settings may be determined as part of the user information. The setting "always open to the public" is a setting that makes tagged image information used when the user himself or herself is a tagged user "always open to the public" on the user information screen of said registered user. In addition, the setting "check each time" is a setting that generates a query as to whether the information should be open to the public should the user become a tagged user.

When a tagging operation is performed in the tagging unit 210, the publishing settings management unit 212 checks the publishing settings information of the tagged user stored in the server memory 22. If the setting is "always open to the public" or if, as a result of the query, a response in favor of making the information open to the public is received via the server communication unit 12, the publishing settings management unit 212 posts the image information on the user information screen of the tagged user and creates said user information screen such that any user can see this image information.

On the other hand, if the response to the query is not open to the public, the publishing settings management unit 212 configures the user information screen such that other registered users, even if they access the user information screen of the tagged user, cannot view the tagged image information. It should be noted that it may be configured to permit viewing by the tagged user himself or herself. In addition, even if the response to the query is not open to the public, the tagging unit may still maintain the association between the tagged user and the tagged image information.

According to this aspect, the following advantages are obtained. Let us assume that a certain user (let this be User A, where User A is configured to perform a check each time he or she is tagged to a photo) tries to upload a photograph, but User A is not present in this photograph. In this case, the photograph can be shared with other users by tagging the other users present in this photograph. In addition, User A can prevent a photograph, in which he or she is not present, from appearing in his or her own profile by not granting approval to the display of the photograph in his or her own profile while inserting a tag with his or her own name into the photograph. At the same time, since User A's tag is attached to the photograph, third parties can be informed of the fact that this photograph has to do with the user (e.g., the user, while not appearing in the photograph, was in the same location).

The facial recognition processing unit 214 receives a request from the uploading user, performs facial recognition on the image information stored in the server memory 22, and selects a user. A query may be used to determine whether or not to perform facial recognition on the uploading user in response to the uploading operation. The selected user is subjected to a tagging by the tagging unit 210, and the tagging operation can be performed automatically.

Specifically, the facial recognition processing unit 214 recognizes at least one piece of facial image information captured in the image information present in the image information stored in the server memory 22, acquires the facial image information of the registered user stored in the server memory 22, and matches one against the other. If it determined that there is a match, the identification information of the user associated with this facial image information is conveyed to the tagging unit 210 and subjected to a tagging operation as a tagged user.

Such determination may be carried out using the formula (number of registered facial image information records)× (number of recognizable facial image information records in the tagged image information). If the number of registered facial image information records is large, it may be limited to friends included in the user information of the user requesting facial recognition and to the users associated with the group to which he or she belongs.

Figure 4:
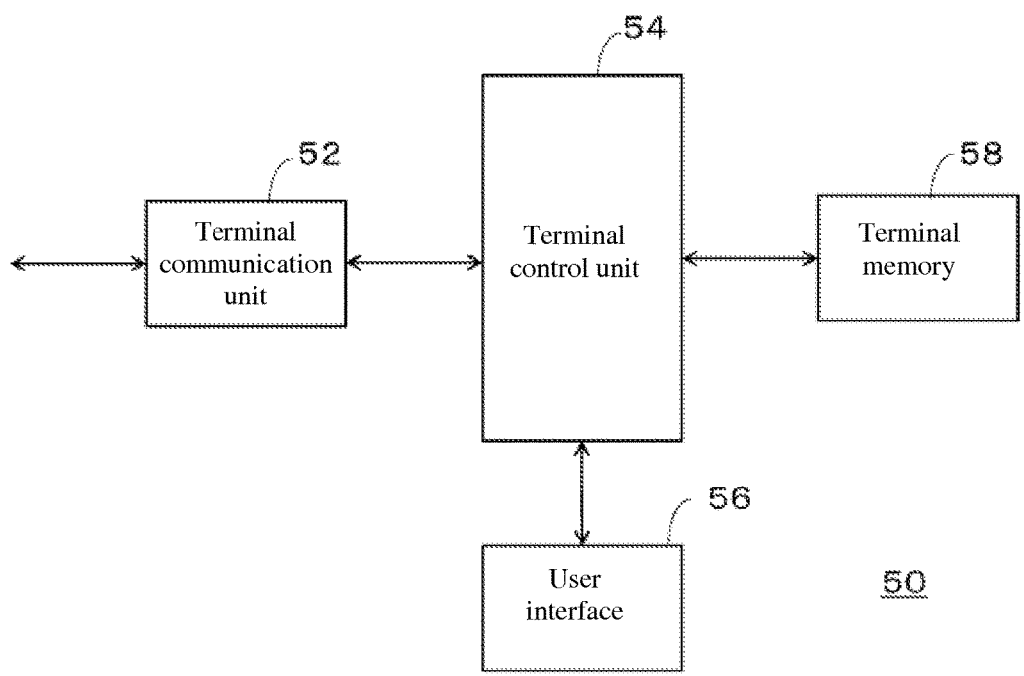
FIG. 4 A diagram illustrating an exemplary configuration of the mobile terminals or PC terminal of FIG. 1.

The configuration used on the user terminal side will be discussed next. FIG. 4 is a diagram illustrating an exemplary configuration used for the mobile terminals 50 or PC terminal 70 of FIG. 1. Although the configuration of the mobile terminal 50 will be discussed here for purposes of convenience in description, the same configuration is used for the PC terminal 70.

The mobile terminal 50 is provided with a terminal communication unit 52, a terminal control unit 54, a user interface 56, and a terminal memory 58. The terminal communication unit 52 receives the chat application downloaded from the server 10, query messages from the server 10 or messages from other users, and the like.

The terminal control unit 54 receives instructions from the user through the user interface 56, and, while accessing the terminal memory 58, exercises control over the installation of the chat application and control over the uploading of the contact information registered in the terminal memory 58, and performs selection of the destination used for chat and operations involving transmission of chat messages, tagging requests, operations involving transmission of selected tagged image information and tagged user information, management of messages addressed to the destination, and the like.

In addition, the user interface 56 includes a screen interface used for displaying messages to the user, a user information screen, and a group information screen; an input interface receiving input from the user, such as a keyboard or a touchscreen panel; and image capture means, such as a camera.

The user interface 56 receives tagging requests and upload requests from the user, or instructions such as tagged user selection and image information associated with the tagging requests, and transmits them to the terminal control unit 54. When a tagged user is selected, a box is specified for entering search terms, and a name is entered there. At such time, user candidates may be displayed in a candidate field of the screen interface once a single character is entered. The order in which they are displayed in the candidate field gives priority to users strongly associated with the user conducting the search. For example, the term "association" refers to an index determined by considering one or more factors such as having friends registered in the chat system, belonging to the same group, a high frequency of chat sessions, having many common friends, and so forth.

The messages to the user refers, for instance, to queries as to whether or not the contact information stored in the memory 60 may be imported into the server 10, to queries related to display settings, or to the designation of the destination to be used during chat and editing screens used for messages addressed to the destination, and the like. These messages may be displayed on a predetermined chat interface screen.

The terminal memory 58 stores image information received from the image capture means and other users, and, in addition, stores contact information in which names are stored in conjunction with contact details.

Below, explanations will be provided regarding the general operation of the mobile terminals 50, as an example of a situation in which User A initiates the use of the chat service.

It is assumed that User A has a chat application installed on User A's mobile terminal 50. At such time, the terminal control unit 54 displays a popup message, such as "Import Address Book?" etc., on the user interface 56, and if the user presses the "Yes" button in response, the contact information stored in the terminal memory 58 is imported into the server memory 22 of the server 10.

It should be noted that when the chat application is installed, the contact information stored in User A's terminal memory 58 may be automatically imported into the server 10 without showing popup displays or the like. In addition, import operations may be carried out on a periodic basis and, in addition to that, import operations may be carried out when new contact information is added to the terminal memory 58.

Next, the phone numbers, e-mail addresses, and the like contained in the contact information on the server 10 are matched with the contact information of the registered users stored on the server 10, and if there is a matching registered user, the contact information of the registered user and the imported address information are merged.

In this manner, if the chat application is installed, contact information related to the user's acquaintances that is registered in the terminal memory 58 of the mobile terminal 50 is automatically registered as chat partners. For this reason, the user can start using the chat service without stress.

Next, explanations will be provided regarding an exemplary situation in which User A exchanges messages with User B via chat.

When User A launches the chat application, the user interface 56 displays information on users registered as friends in the friend list as candidate destinations. For example, User A selects User B from the displayed candidates as the destination party of the message. The selected destination is conveyed to the server 10 via the terminal control unit 54 and terminal communication unit 52.

Subsequently, the server 10 determines the communication mode (chat, e-mail, or SNS) of the message based on User B's contact information and priority information. As described above, the "priority information" is information indicating the order of priority used to select the communication mode to be used when sending messages. For example, if, according to the priority information, Chat>SNS message>E-mail address>SMS and User B is a registered user of the chat service, the communication mode is Chat. In addition, if User B is an unregistered user for whom only an e-mail address and a phone number are known, the selected communication format is based on the e-mail format, which has a higher order of priority.

When User A enters a message for User B in the message field of the chat interface screen displayed on screen by the user interface 56 and presses the Send button, the message is transmitted to User B via the terminal control unit 54, terminal communication unit 52, and server 10. If the e-mail mode is selected as the mode of communication with User B, the server 10 converts User A's chat message to the e-mail format and an e-mail is transmitted from the server 10 to User B's e-mail address imported from the terminal memory 58.

When User B, who is an unregistered user, receives the message in the e-mail format from User A and replies to this message using the e-mail format, the server 10, first of all, converts the e-mail from User B to a message in the chat format and transmits it to User A's mobile terminal 50, where it is displayed on the chat interface on the display of the terminal.

Figure 5:
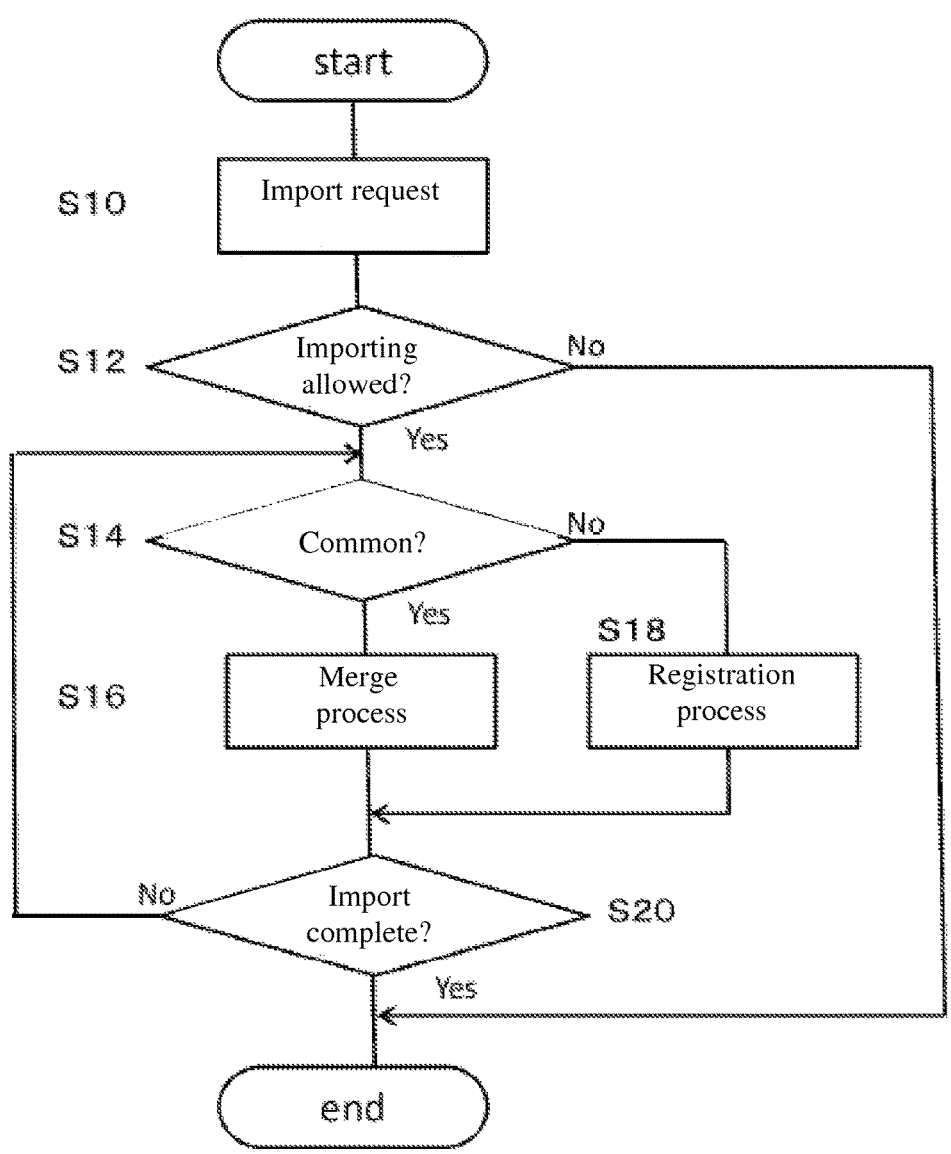
FIG. 5 A flow chart illustrating an exemplary processing procedure used by the user information management unit of FIG. 2.

FIG. 5 is a flow chart illustrating an exemplary processing procedure used by the user information management unit 14 of FIG. 2. This flow chart is triggered in response to the downloading of the application on the user terminal.

First, the user information management unit 14 issues an import request addressed to the user terminal via the server communication unit 12 (S10). The import request is used to pose a query as to whether or not the contact information stored in the memory of the user terminal may be uploaded to the server 10 and stored in the server memory 22 of the server 10.

Here, if a signal to the effect that importing is not permitted is received from the user terminal by the server communication unit 12 ("No" in S12), the user information management unit 14 terminates the process. On the other hand, if a signal to the effect that importing is permitted is received from the user terminal ("Yes" in S12), the subsequently transmitted contact information is acquired via the server communication unit 12.

If, as a result of matching the acquired contact information against the contact information already registered in the server memory 22, it is found that there is common information ("Yes" in S14), the user information management unit 14 merges the contact information stored in the server memory 22 with the acquired contact information (S16). On the other hand, if there is no common information ("No" in S14), the user information management unit 14 registers the acquired contact information in the server memory 22 "as is" (S18). An ID, or the like, used to identify the contact information may be attached at such time.

Here, if all the contact information which should be imported has been imported ("Yes" in S20), the user information management unit 14 terminates the process. On the other hand, if there is other contact information ("No" in S20), the user information management unit 14 goes back to the process of S14 and repeats the process of S14-S20 until there is no contact information to be imported.

Figure 6:
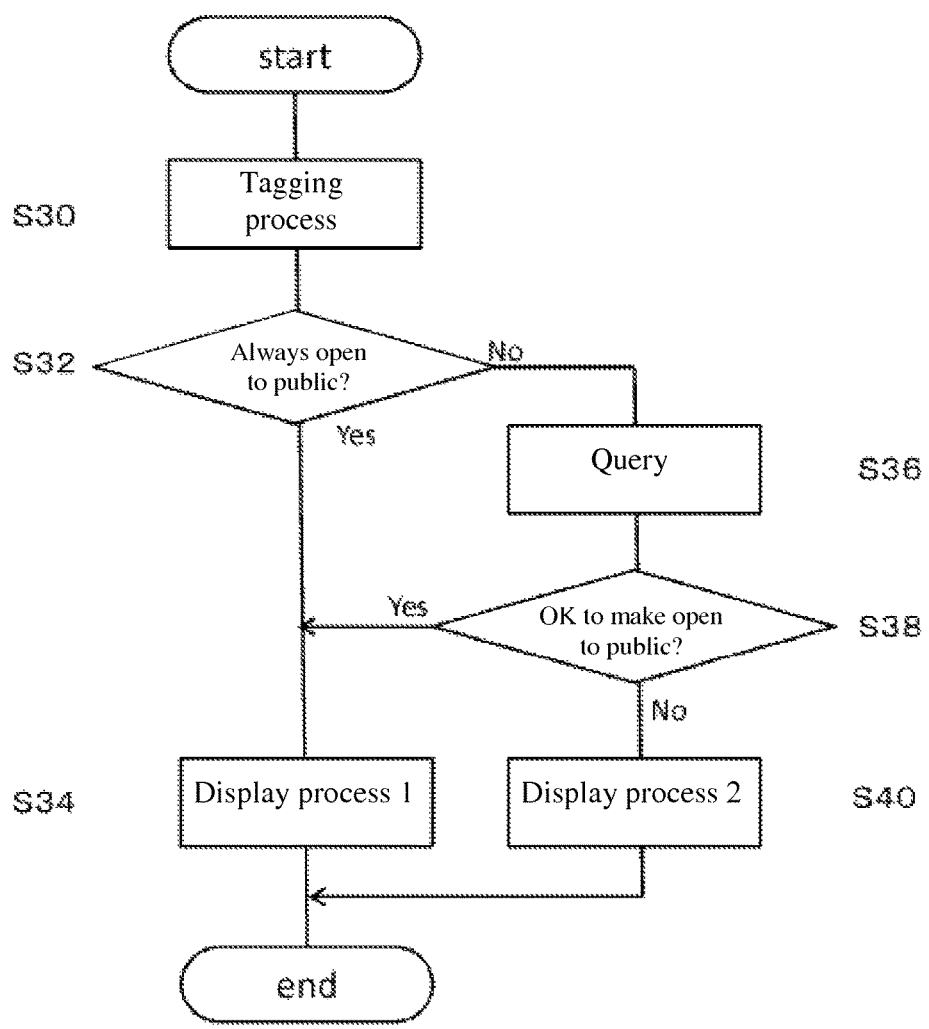
FIG. 6 A flow chart illustrating an exemplary processing procedure used by the tagging control unit of FIG. 2.

FIG. 6 is a diagram illustrating an example of the processing procedure used by the tagging control unit of FIG. 2. This flow chart may be triggered in response to receiving a tagging request from any registered user.

First, in response to the request, the tagging control unit 20 accesses the server memory 22 and performs a tagging operation that associates the received tagged image information with the tagged user (S30).

Next, the tagging control unit 20 checks the publishing settings information associated with the tagged user stored in the server memory 22 (S32) and, if the setting is "always open to the public" ("Yes" in S32), the tagged image information is displayed on the user information screen of the tagged user as display process 1, with the user information screen set up to be viewable by any user.

On the other hand, if the publishing settings information is "check each time" ("No" in S32), the tagging control unit 20 queries the tagged user via the server communication unit 12 (S36). If the result of the query says it is OK to make the information open to the public ("Yes" in S38), the tagging control unit 20 carries out display process 1. On the other hand, if making it open to the public is NG ("No" in S38), the tagging control unit 20 uses display process 2 in which the user information screen is set up to prohibit access by other registered viewers such that the tagged image information is not displayed when other registered users view the user information screen of the tagged user (S40).

Figure 8:
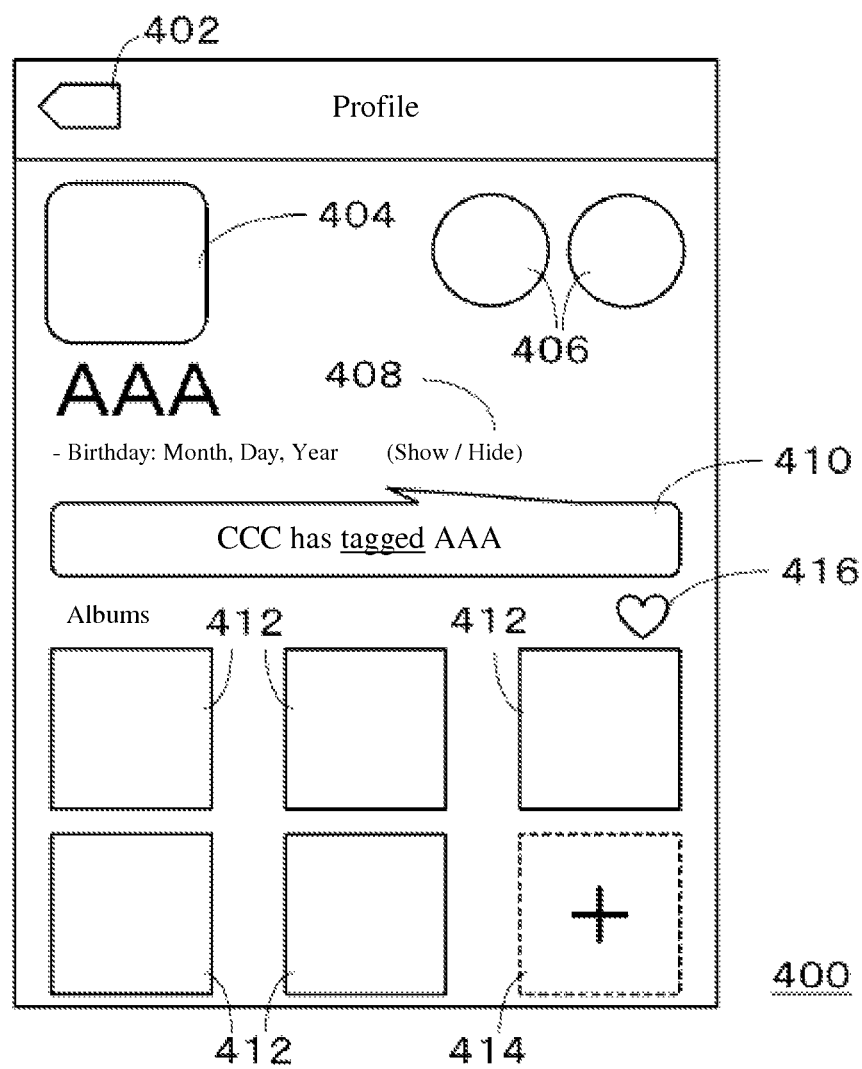
FIG. 8 A diagram illustrating an exemplary second screen display on the user terminals of FIG. 1.
Figure 9:
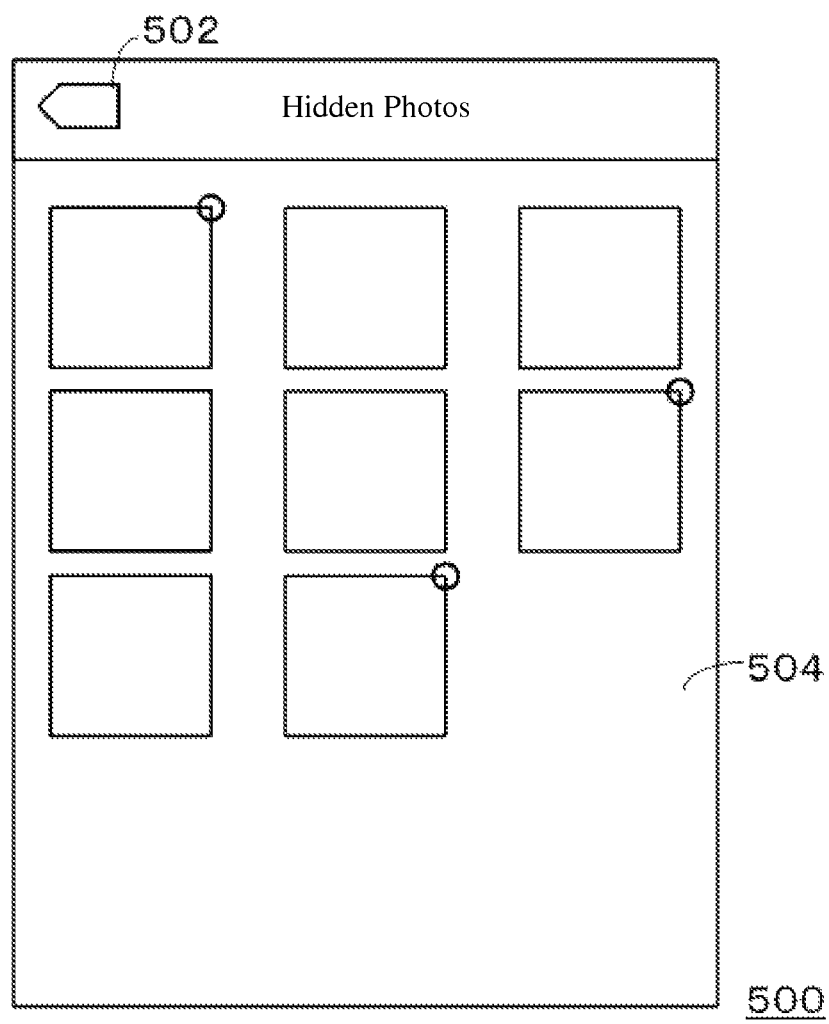
FIG. 9 A diagram illustrating an exemplary third screen display on the user terminals of FIG. 1.

Finally, the Setup screen displayed on the user terminal during the tagging operation and the user information screen of the tagged user upon completion of the tagging operation will be described with reference to FIGS. 7-9. It should be noted that FIGS. 7-9 depict a process in which, upon receiving user instructions from the user interface 56 in the user terminal configuration illustrated in FIG. 4 and, for example, tapping on the screen, the terminal control unit 54 performs the operation associated with the tapped location, accesses the terminal memory 58, communicates with the server via the terminal communication unit 52, and carries out display processing on the screen of the user interface 56.

Figure 7:
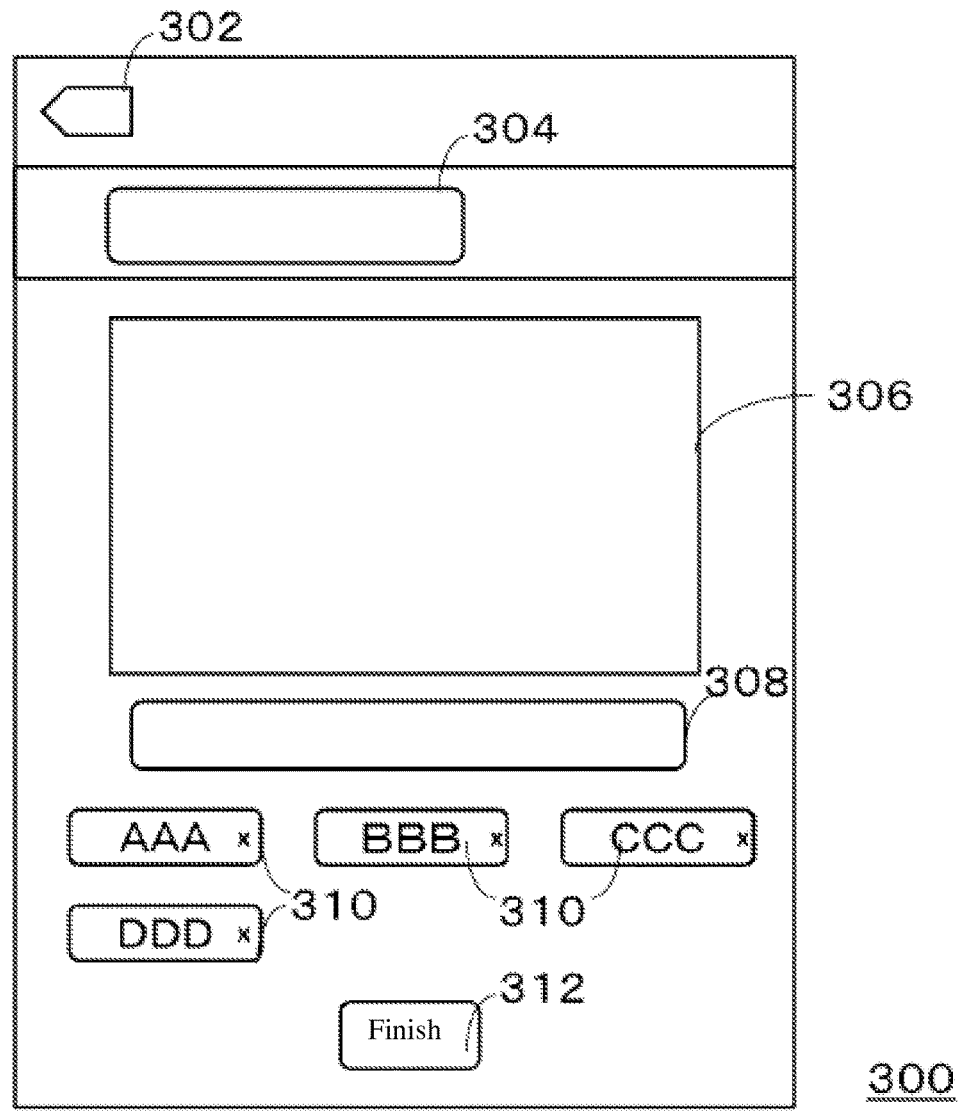
FIG. 7 A diagram illustrating an exemplary first screen display on the user terminals of FIG. 1.

FIG. 7 is a diagram illustrating a first exemplary screen display on the user terminal of FIG. 1. The first exemplary screen display 300 is a screen displayed on the screen of the user terminal of the tagged user when a tagging operation is performed. The first exemplary screen display 300 may be displayed on the chat screen, onto which uploaded images are uploaded, or on the user information screen of another registered user when the user taps an uploaded image to perform a tagging operation.

The first exemplary screen display 300 includes a "Back" button 302, a search box 304, an uploaded image display field 306, an image title display field 308, tagged user display fields 310, and a "Finish" button.

The "Back" button 302 is used to go back to the previously displayed screen, and tapping on it causes the screen to transition to the previously displayed screen.

The search box 304, which is used to enter the names of users one would like to tag, enables character entry if the user taps on it. The names of the tagged users are entered and searched using the input interface. When multiple users are searched, the results are displayed and the user is allowed to make the selection.

The uploaded image display field 306 is a field in which images uploaded by uploading user are displayed. The image title display field 308, which is a field where image titles are displayed, enables character entry when a user taps on it, whereupon titles are entered using the input interface and displayed.

The tagged user display fields 310 are fields where the names of users that have been tagged. In addition, they also serve as buttons that can be used to stop tagging by tapping on the "x" in the fields. These fields are added one-by-one when the user taps on the names displayed after executing a search in the search box 304. The tapped names are displayed in the fields. The drawing shows that four users, AAA, BBB, CCC, and DDD, have been tagged.

When the tagging operation is finished, the "Finish" button 312 is tapped by the user and, as a result, a transition takes place from this screen to another screen. That screen may be the screen that was displayed before the current screen.

FIG. 8 is a diagram illustrating a second exemplary screen display on the user terminal of FIG. 1. The second exemplary screen display 400 is a user information screen (hereinafter referred to as "profile screen") displayed on the user terminal of the tagged user. The transition to the second exemplary screen display may take place automatically after tagging. Alternatively, it may be displayed when the user, after receiving a message about tagging, taps on the message box.

The second exemplary screen display 400 includes a "Back" button 402, a user image display field 404, "Transition" buttons 406, a "Birthday Disclosure Settings" button 408, a message field 410, album display fields 412, "Add Image" buttons 414, and a "View Hidden Images" button.

The "Back" button 402 is functionally equivalent to the "Back" button 302 shown in FIG. 7. The user image display field 404 is a field in which profile photos and other images uploaded by registered users are displayed. The "Transition" buttons 406 are buttons used for transitioning to other screens, such as a call setup screen, a chat screen, and the like, with the transitions taking place when the user taps on the buttons.

The "Birthday Disclosure Settings" button 408 is a button used to configure whether to disclose one's birthday or keep it private. If the user presses the "Show" button, anyone can see the birthday, and if the "Hide" button is pressed, the birthday cannot be seen by any users other than the user. The message field 410 is a field in which messages to the present user are displayed. In the drawing, a sample message about tagging is displayed. If the underlined portion (which says "tagged") is tapped, a transition may be made to a screen on which a tagged image has been uploaded.

The album display fields 412 are fields in which images (open to the public in response to queries) tagged by the registered user of this user information screen are displayed. They can be viewed by any user.

The "View Hidden Images" button 416, which is indicated using a heart-shaped mark, is a button used for transitioning to a screen on which tagged images that have been set to "Hidden" are displayed. This button is only displayed when the present user is viewing the user information screen, and may be hidden when viewed by other users.

FIG. 9 is a diagram illustrating a third exemplary screen display 500 on the user terminal of FIG. 1. The third exemplary screen display 500 is a page used to display images for which the response to the query by the publishing settings management unit 212 was "not open to the public", as well as images for which no response to the query has been provided. This page can only be viewed by the registered user of this user information screen. This third exemplary screen display 500 is a screen displayed when the "View Hidden Images" button of FIG. 8 is tapped.

The third exemplary screen display 500 includes a "Back" button 502 and a field for displaying images set to "Hidden" 504. The "Back" button 502 is functionally equivalent to the "Back" button 302 of FIG. 7 and the "Back" button 402 of FIG. 8.

The field for displaying images set to "Hidden" 504 is a field used to display images for which the response to the query by the publishing settings management unit 212 was "not open to the public", as well as images for which no response to the query has been provided. As shown in the drawing, eight images are displayed, with three images out of them having a circle displayed in the top right corner. This circle indicates that no response to the query has been provided for this image. By tapping on it, the user provides a response to the query regarding making said image visible or invisible.

In accordance with the aspects described above, when exchanging messages using the chat service, registered users can engage in chat with partners without being aware of whether or not their partners are registered with the chat service. In addition, in the chat system 100, appropriate conversion of communication modes based on the priority information and contact information stored on the server 10 allows for smooth chat sessions between registered users and unregistered users to be implemented without making the users perform redundant operations.

In addition, the registered users can tag any users to images uploaded to the chat screen or images uploaded to the user information screen, on which the profile photos, profile information, and the like of the users are displayed. The users who can perform tagging may be different from the users who uploaded said images. In addition, the users subject to tagging may be any users and, furthermore, groups having multiple registered users can also be selected as units.

In addition, as a result of eliminating the problems above and applying restrictions to tagging in an appropriate manner, a person who wishes to share images can tag the people with whom he or she wishes to share with, and moreover, this makes it possible to promote smoother communication. There is no association between the tagging users, tagged users, and uploading users, and anyone can perform tagging as long as he or she is a registered user. In addition, the user that can be selected as the object of tagging may be any registered user, and a specific group may also be selected as the object. In addition, unregistered users who are not registered in the chat system can be tagged as well. By imparting more flexibility to tagging in this way, smoother communication can be promoted.

The image information that can be selected as the object of tagging may be image information uploaded during chat sessions and image information displayed on the user information screen of any user. That is, anyone can tag any uploaded image information regardless of the identity of the user who uploaded the image information. Even in the case of an image viewable only by a limited number of users in the closed space of a chat session, performing a tagging operation on the image allows for it to be shared even with users who are not taking part in the chat session, which makes it possible to promote smoother communication.

In addition, tagging the identification information of the selected group and the tagged image information, as well as tagging each of one or more registered users associated with said group in the group management unit and the tagged image information, allows for images to be shared using groups representing specific common denominators as units and, in addition, enables sharing with users within the groups, which promotes smoother intra-group communication.

In addition, sending a notification of tagging and link information to the tagged image information to the tagged users managed by the tagging control unit upon completion of tagging makes it possible to reliably inform the users of the fact that they have been tagged, encourage subsequent intra-group communication, and promote smoother communication.

In addition, even when tagging unregistered users, the notification of tagging and link information to the tagged image information can be provided more efficiently and the unregistered users can be encouraged to participate in the chat system. This can help increase the number of participants in the entire chat system and promote smoother and livelier communication.

In addition, privacy management can be implemented in a fine-tuned manner, such that the setting "always open to the public" is configured depending on the selection made by said registered user, and if the selection is set to not "always open to the public", then the user is queried as to whether or not a public disclosure should be made if the user is considered a tagged user in the tagging control unit, which makes it possible to promote smoother communication.

In addition, maintaining the association between the tagged user and the tagged image information even if the response is "hide" allows for privacy management to be implemented in a fine-tuned manner and makes it possible to promote smoother communication.

In addition, performing facial recognition on the image information can simplify tagging and ease the burden on the user.

In addition, anyone can delete malicious tagging and smoother communication can be promoted due to the fact that, in response to a request from any registered user, the association between the registered user associated with the request and tagged image information is deleted.

In addition, deleting image information only when the registered user associated with the delete request is the uploading user of said image information provides for appropriate image management and can promote smoother communication.

The present invention has been described above with reference to embodiments. The present invention is not limited to the above-described embodiments and the content of the embodiments and can be practiced with various modifications within the scope of the present invention. The above-described embodiments are illustrative, and it will be appreciated by those skilled in the art that numerous variations are possible based on combining these constituent elements and processing procedures and that such variations are also within the scope of the present invention.

INDUSTRIAL APPLICABILITY

The present invention relates to technology for transmitting and receiving messages using information processing terminals. The present invention can provide a server device, a method, and a system capable of promoting smoother communication over a network by applying restrictions to tagging in an appropriate manner.

REFERENCE NUMERALS

10 Server
12 Server communication unit
14 User information management unit
16 Chat control unit
18 Display control unit
20 Tagging control unit
22 Server memory
30 Network
40 Base station
40a First base station
40b Second base station
40c Third base station
50 Mobile terminal
50a First mobile terminal
50b Second mobile terminal
50c Third mobile terminal
52 Terminal communication unit
54 Terminal control unit
56 User interface
58 Terminal memory
70 PC terminal
100 Chat system
210 Tagging unit
212 Publishing settings management unit
214 Facial recognition processing unit
300 First exemplary screen display
302 "Back" button
304 Search box
306 Uploaded image display field
308 Image title display field
310 Tagged user display field
312 "Finish" button
400 Second exemplary screen display
402 "Back" button
404 User image display field
406 "Transition" button
408 "Birthday Disclosure Settings" button
410 Message field
412 Album display field
414 "Add Image" button
416 "View Hidden Images" button
500 Third exemplary screen display
502 "Back" button
504 Field for displaying images set to "Hidden"

The invention claimed is:

1. A server device provided with: an image information storage unit that stores image information uploaded by any registered user who is registered with a service; a tagging control unit that manages the association between tagged image information that is subjected to tagging and tagged users by performing a tagging operation that associates the image information uploaded to the image information storage unit by the uploading user with any registered user in response to a request from the uploading user who uploaded the image information or other registered users; and a display control unit that displays the tagged image information stored in the image information storage unit on a user information screen, on which information relating to tagged users managed by the tagging control unit is to be displayed; there is provided a group configuration unit that configures a plurality of groups respectively having specific characteristics, and a group management unit that manages the association between the identification information of groups selected by a registered user among the plurality of groups configured by the group configuration unit and the identification information of the registered user, and the tagging control unit, in the event that any of the groups managed by the group management unit is selected as a tagged user, performs a tagging operation on the identification information of the selected group and tagged image information, and also performs a tagging operation on each of one or more registered users associated with said group in the group management unit and tagged image information, and the display control unit displays the tagged image information that has been tagged at a group level on a group information screen, on which information relating to said group is to be displayed, or the user information screen of one or more registered users associated with said group in the group management unit.

2. The server device according to claim 1, wherein:
the service is a chat service used for transmitting and receiving messages between registered users, and
there is provided a chat control unit that controls chat between a plurality of registered users, and
the tagging control unit associates uploaded image information with a registered user taking part in a chat session as a tagged user if there is a request to perform a tagging operation on image information uploaded while a chat session is in progress in the chat control unit.

3. The server device according to claim 1 provided with a server communication unit which, upon completion of the tagging operations by the tagging control unit, sends the tagged users managed by the tagging control unit a notification of tagging and provides link information to the tagged image information.

4. The server device according to claim 3, wherein:
the tagging control unit allows for tagging operations to be performed on unregistered users who are not registered with said chat service, and
the server communication unit, in the event that a tagged user managed by the tagging control unit is an unregistered user, sends this unregistered user a notification of tagging and link information to the tagged image information by e-mail.

5. The server device according to claim 1, which is provided with:
a publishing settings management unit which, for every registered user, depending on a selection made by said registered user, configures whether or not tagged image information when the user is a tagged user should be made "always open to the public" on the user information screen of said registered user, or, if the selection has been made to not make it "always open to the public", issues a query whether or not to make it open to the public if the user is considered as a tagged user in the tagging control unit,
and in which the display control unit, if the setting used in the publishing settings management unit is "always open to the public", or if the response to the query is open to the public, permits viewing of tagged images on the user information screen of said registered user by other registered viewers, and, if the response to the query is not open to the public, prohibits viewing by other registered users.

6. The server device according to claim 5 wherein, even if the response from a tagged user, who has selected to not "always open to the public" in the publishing settings management unit, is "hide", the tagging control unit maintains an association between the tagged user and the tagged image information.

7. The server device according to claim 1, which is provided with:
a user information management unit that manages at least one item such as a name, an ID number, or a facial image information record as user information used to identify registered users and non-registered users, and
a facial recognition processing unit that performs facial recognition on the tagged image information contained in the image information stored in the image information storage unit to determine whether or not at least one facial image information record captured in said image information matches any facial image information record among a plurality of user information records managed by the user information management unit, and
in which the tagging control unit, if the two facial image information records are determined to be a match by the facial recognition processing unit, associates said image information with user information that includes the facial image information managed by the user information management unit.

8. The server device according to claim 1 wherein, in response to a request from any registered user, the tagging control unit deletes the association between the registered user associated with the request and the tagged image information.

9. The server device according to claim 1, wherein:
the image information storage unit, in the event of a delete request regarding stored image information, deletes this image information only if the registered user submitting the delete request is the uploading user of said image information;
the tagging control unit, in the event of deletion of image information in the image information storage unit, deletes the association between the image information and the tagged user; and
the display control unit hides the tagged image information on the user information screen of the tagged user, whose association has been deleted in the tagging control unit.

10. A control method comprising the steps of:
storing image information uploaded by any registered user who is registered with the service;
managing the association between tagged image information that is subjected to tagging and tagged users by performing a tagging operation that associates image information uploaded by the uploading user with any registered user in response to a request from the uploading user who uploaded the image information or other registered users; and
displaying the tagged image information on a user information screen, on which information relating to tagged users is displayed;
configuring a plurality of groups respectively having specific characteristics, and
managing the association between the identification information of groups selected by a registered user among the plurality of groups configured by the group configuration unit and the identification information of the registered user, and
in the event that any of the groups is selected as a tagged user, performing a tagging operation on the identification information of the selected group and tagged image information, and also performing a tagging operation on each of one or more registered users associated with said group and the tagged image information, and
displaying the tagged image information that has been tagged at a group level on a group information screen, on which information relating to said group is to be displayed, or the user information screen of one or more registered users associated with said group.

11. A system comprising a server device and terminal devices, wherein:
the server device is provided with:
an image information storage unit that stores image information uploaded from any registered user;
a tagging control unit that manages the association between tagged image information that is subjected to tagging and tagged users by performing a tagging operation that associates the image information uploaded to the image information storage unit by the uploading user with any registered user in response to a request from the uploading user who uploaded the image information or other registered users; and
a display control unit that displays the tagged image information stored in the image information storage unit on a user information screen, on which information relating to tagged users managed by the tagging control unit is displayed;
a group configuration unit that configures a plurality of groups respectively having specific characteristics, and
a group management unit that manages the association between the identification information of groups selected by a registered user among the plurality of groups configured by the group configuration unit and the identification information of the registered user, and
the tagging control unit, in the event that any of the groups managed by the group management unit is selected as a tagged user, performs a tagging operation on the identification information of the selected group and tagged image information, and also performs a tagging operation on each of one or more registered users associated with said group in the group management unit and tagged image information, and
the display control unit displays the tagged image information that has been tagged at a group level on a group information screen, on which information relating to said group is to be displayed, or the user information screen of one or more registered users associated with said group in the group management unit;
and
the terminal device is provided with:
an input interface that receives instructions from users;
a terminal storage unit that stores any image information;
a contact information storage unit that stores names in conjunction with contact details;
a screen interface that displays information in accordance with instructions from the display control unit; and, a terminal communication unit that uploads the image information stored in the terminal storage unit to the server device in accordance with content received via the input interface; and the terminal communication unit, in accordance with content received via the input interface, selects a user associated with a name stored in the contact information storage unit as a tagged user, and also selects image information displayed on the screen interface as tagged image information, thereby issuing a tagging request to the server device.

\* \* \* \* \*